US012606025B2

(12) United States Patent
Gudapati et al.

(10) Patent No.: US 12,606,025 B2
(45) Date of Patent: Apr. 21, 2026

(54) TECHNIQUES FOR CONTROLLING ENERGY CONSUMPTION AND ENHANCING SYSTEMIC EFFICIENCY THROUGH MANAGEMENT OF THERMAL DEVICES FOR ELECTRIFIED VEHICLES

(71) Applicant: FCA US LLC, Auburn Hills, MI (US)

(72) Inventors: Abhilash Gudapati, Troy, MI (US); Rudolph Kharpuri, Auburn Hills, MI (US); Raviteja Chanumolu, Hyderabad (IN)

(73) Assignee: FCA US LLC, Auburn Hills, MI (US)

( * ) Notice: Subject to any disclaimer, the term of this patent is extended or adjusted under 35 U.S.C. 154(b) by 204 days.

(21) Appl. No.: 18/624,415

(22) Filed: Apr. 2, 2024

(65) Prior Publication Data

US 2025/0303871 A1    Oct. 2, 2025

(51) Int. Cl.
　　*B60L 1/02*　　　(2006.01)
　　*B60L 58/20*　　(2019.01)
(52) U.S. Cl.
　　CPC ................. *B60L 1/02* (2013.01); *B60L 58/20* (2019.02); *B60L 2210/10* (2013.01)
(58) Field of Classification Search
　　CPC ......... B60L 1/02; B60L 58/20; B60L 2210/10
　　USPC ........................................................ 165/202
　　See application file for complete search history.

(56) References Cited

U.S. PATENT DOCUMENTS 6,424,157 B1 * 7/2002 Gollomp ................. B60L 58/12
                                                                    324/426
8,775,008 B2 * 7/2014 Rini ........................ B60L 58/16
                                                                    396/48

8,793,042 B2 * 7/2014 Gale ....................... B60L 58/22
                                                                    701/22
8,854,008 B2 * 10/2014 Liu .......................... B60L 58/22
                                                                    320/132
8,996,241 B2 * 3/2015 Uchida ............... H01M 10/425
                                                                    701/29.6
9,260,033 B2 * 2/2016 Hayashida ........... G01R 31/382
9,381,824 B2 * 7/2016 Tabatowski-Bush ......................
                                                                    H02J 7/0014
9,758,091 B2 * 9/2017 Bolduc .................... B60L 3/04
10,457,155 B2 10/2019 Wu et al.
10,696,181 B2 6/2020 Hu et al.
10,744,891 B2 * 8/2020 Luedtke ................. B60L 58/20
(Continued)

FOREIGN PATENT DOCUMENTS

CN          112977064 A          6/2021
CN          114290900 A          4/2022

*Primary Examiner* — Claire E Rojohn, III
(74) *Attorney, Agent, or Firm* — Jeremy J. Klobucar

(57)　　　　　　ABSTRACT

A control and thermal management method for an electrified vehicle includes, in response to a valid wakeup request, transmitting, by a supervisory controller and via a local interconnect (LIN) bus, timing instructions for operation of a set of thermal systems powered by low voltage battery, in response to an ignition-off request, commanding, by the supervisory controller and via the LIN bus, a request for the set of thermal systems to complete their existing functions within a calibratable period, and in response to a function completion confirmation from the set of thermal systems, commanding, by the supervisory controller, the LIN bus and the set of thermal systems to shutdown, thereby avoiding a communication delay or a malfunction that could result in the set of thermal systems remaining active after the LIN bus is shutdown.

18 Claims, 3 Drawing Sheets

(56) References Cited

U.S. PATENT DOCUMENTS

| | | | | |
|---|---|---|---|---|
| 10,924,008 | B2 * | 2/2021 | Shen | H02M 3/07 |
| 11,081,742 | B2 | 8/2021 | Legnedahl | |
| 11,597,289 | B2 | 3/2023 | Powell et al. | |
| 2013/0038293 | A1 * | 2/2013 | Seman, Jr. | H01M 10/441 |
| | | | | 320/134 |
| 2013/0200690 | A1 * | 8/2013 | Rini | B60L 3/04 |
| | | | | 307/9.1 |
| 2016/0303992 | A1 * | 10/2016 | Lovett | B60W 20/13 |
| 2016/0378427 | A1 * | 12/2016 | Sharma | G10L 19/0212 |
| | | | | 700/94 |
| 2018/0072178 | A1 * | 3/2018 | Williams | B60L 1/00 |
| 2018/0131052 | A1 * | 5/2018 | Reibling | H01M 10/633 |
| 2019/0017311 | A1 * | 1/2019 | McGettrick | E05F 15/697 |
| 2019/0351778 | A1 * | 11/2019 | Namuduri | B60L 53/65 |
| 2020/0114768 | A1 * | 4/2020 | Oestreich | G01R 31/382 |
| 2020/0122686 | A1 * | 4/2020 | Siswick | B60R 25/01 |
| 2020/0307409 | A1 * | 10/2020 | Uyeki | B60L 53/66 |
| 2021/0101498 | A1 * | 4/2021 | Sugimoto | B60L 53/11 |

| | | | | |
|---|---|---|---|---|
| 2022/0089058 | A1 * | 3/2022 | Vuylsteke | H01M 10/486 |
| 2022/0212545 | A1 * | 7/2022 | Araujo Xavier | B60L 50/60 |
| 2022/0212561 | A1 * | 7/2022 | Tabatowski-Bush | B60L 3/12 |
| 2022/0234529 | A1 * | 7/2022 | Remes | G01R 31/3835 |
| 2022/0263683 | A1 * | 8/2022 | Owerfeldt | H04L 12/40123 |
| 2023/0112801 | A1 * | 4/2023 | Vrampas | B60L 53/67 |
| | | | | 320/109 |
| 2023/0347763 | A1 * | 11/2023 | Razi | H02J 7/02 |
| 2023/0415580 | A1 * | 12/2023 | Wang | H01H 83/10 |
| 2024/0113364 | A1 * | 4/2024 | Gudapati | B60L 50/10 |
| 2024/0154432 | A1 * | 5/2024 | Valero | G01R 19/10 |
| 2024/0308358 | A1 * | 9/2024 | Irgens | H02J 9/061 |
| 2024/0424903 | A1 * | 12/2024 | Li | G01R 31/3835 |
| 2024/0424904 | A1 * | 12/2024 | Xie | B60L 58/20 |
| 2024/0424952 | A1 * | 12/2024 | Pang | H02J 7/0014 |
| 2025/0001999 | A1 * | 1/2025 | Kharpuri | B60W 10/26 |
| 2025/0062476 | A1 * | 2/2025 | Mahakali | H01M 50/249 |
| 2025/0108710 | A1 * | 4/2025 | Gudapati | B60L 58/40 |
| 2025/0115162 | A1 * | 4/2025 | Lee | B60L 50/60 |
| 2025/0196688 | A1 * | 6/2025 | Wang | B60L 53/62 |

* cited by examiner

TECHNIQUES FOR CONTROLLING ENERGY CONSUMPTION AND ENHANCING SYSTEMIC EFFICIENCY THROUGH MANAGEMENT OF THERMAL DEVICES FOR ELECTRIFIED VEHICLES

FIELD

The present application generally relates to electrified vehicle control and thermal management systems and, more particularly, to techniques for controlling energy consumption and enhancing systemic efficiency through management of thermal devices for electrified vehicles.

BACKGROUND

The low voltage (e.g., 12V) battery on an electrified vehicle is at risk for significant energy drainage during ignition-off states. Thermal system components of the electrified vehicle, such as fans/pumps, consume significant amounts of energy. In some cases, vehicle wakeups could cause at least some of these thermal system components to activate, which causes significant energy drainage from the low voltage battery and could cause various downstream issues (insufficient energy for engine cranking, high voltage system drainage, high voltage system contactor welding, etc.). This unexpected or unintended operation of the thermal system components could be confusing or annoying for the customer (e.g., "Why does my vehicle sound like its running?"). Accordingly, while such conventional electrified vehicle control/thermal systems do work for their intended purpose, there exists an opportunity for improvement in the relevant art.

SUMMARY

According to one example aspect of the invention, a control and thermal management system for an electrified vehicle is presented. In one exemplary implementation, the system comprises a set of thermal systems each powered by a low voltage battery of the electrified vehicle and each configured to regulate a temperature of a thermal loop of the electrified vehicle and a supervisory controller connected to the set of thermal systems via a local interconnect network (LIN) bus and configured to, in response to a valid wakeup request, transmit, via the LIN bus, timing instructions for operation of the set of thermal systems, thereby avoiding unnecessary energy drainage from the low voltage battery, in response to an ignition-off request, command, via the LIN bus, a request for the set of thermal systems to complete their existing functions within a calibratable period, and in response to a function completion confirmation from the set of thermal systems, command the LIN bus and the set of thermal systems to shutdown, thereby avoiding a communication delay or a malfunction that could result in the set of thermal systems remaining active after the LIN bus is shutdown.

In some implementations, the electrified vehicle goes to sleep in response to the ignition-off request after the set of thermal systems and the LIN bus are shutdown. In some implementations, the set of thermal components includes at least one of a fan and a pump. In some implementations, the electrified vehicle also includes another set of thermal systems powered by a high voltage system of the electrified vehicle. In some implementations, the supervisory controller is further configured to command a high voltage contactor of the high voltage system to close to enable the high voltage system and allow a direct current to direct current (DC-DC) converter to charge and maintain the low voltage battery.

In some implementations, the high voltage system and the DC-DC converter are further configured to power at least some of the set of thermal devices associated with the low voltage battery. In some implementations, avoiding unnecessary energy drainage from the low voltage battery ensures the electrified vehicle is capable at least one of (i) cranking an engine of the electrified vehicle and (ii) closing a high voltage contactor of a high voltage battery system of the electrified vehicle without a current spike causing the high voltage contactor to weld. In some implementations, the communication delay is a result of the LIN bus being slower than other controller area network (CAN) buses and the malfunction is a memory corruption or error. In some implementations, avoiding the communication delay and the malfunction ensures that the set of thermal components avoid potential damage due to unnecessary and unexpected operation.

According to another example aspect of the invention, a control and thermal management method for an electrified vehicle is presented. In one exemplary implementation, the method comprises providing a set of thermal systems and a supervisory controller connected to each other via a LIN bus, wherein each thermal system is powered by a low voltage battery of the electrified vehicle and is configured to regulate a temperature of a thermal loop of the electrified vehicle, in response to a valid wakeup request, transmitting, by the supervisory controller and via the LIN bus, timing instructions for operation of the set of thermal systems, thereby avoiding unnecessary energy drainage from the low voltage battery, in response to an ignition-off request, commanding, by the supervisory controller and via the LIN bus, a request for the set of thermal systems to complete their existing functions within a calibratable period, and in response to a function completion confirmation from the set of thermal systems, commanding, by the supervisory controller, the LIN bus and the set of thermal systems to shutdown, thereby avoiding a communication delay or a malfunction that could result in the set of thermal systems remaining active after the LIN bus is shutdown.

In some implementations, the electrified vehicle goes to sleep in response to the ignition-off request after the set of thermal systems and the LIN bus are shutdown. In some implementations, the set of thermal components includes at least one of a fan and a pump. In some implementations, the electrified vehicle also includes another set of thermal systems powered by a high voltage system of the electrified vehicle. In some implementations, the method further comprises commanding, by the supervisory controller, a high voltage contactor of the high voltage system to close to enable the high voltage system and allow a DC-DC converter to charge and maintain the low voltage battery.

In some implementations, the high voltage system and the DC-DC converter are further configured to power at least some of the set of thermal devices associated with the low voltage battery. In some implementations, avoiding unnecessary energy drainage from the low voltage battery ensures the electrified vehicle is capable at least one of (i) cranking an engine of the electrified vehicle and (ii) closing a high voltage contactor of a high voltage battery system of the electrified vehicle without a current spike causing the high voltage contactor to weld. In some implementations, the communication delay is a result of the LIN bus being slower than other CAN buses and the malfunction is a memory corruption or error. In some implementations, avoiding the communication delay and the malfunction ensures that the set of thermal components avoid potential damage due to unnecessary and unexpected operation.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, thermal system components of an electrified vehicle, such as fans/pumps, consume significant amounts of energy and, in some cases, vehicle wakeups could cause at least some of these thermal system components to activate, which causes significant energy drainage from the low voltage battery and could cause various downstream issues (insufficient energy for engine cranking, high voltage system drainage, high voltage system contactor welding, etc.). This unexpected or unintended operation of the thermal system components could be confusing or annoying for the customer (e.g., "Why does my vehicle sound like its running?"). The above-described issues arise due to most thermal system components being connected on a local interconnect (LIN) bus. Communication via LIN buses is much slower than communication via controller area network (CAN) buses and, in particular, via higher speed CAN buses that are more prevalent in today's electrified vehicles. This could result in the LIN-based thermal system components running when not intended due to communication or memory malfunctions. Accordingly, improved control and thermal management systems and methods for electrified vehicles that solve the above-described problems are presented herein.

A vehicle mode manager sub-system ("VMMS") controls the enablement/disablement of the high voltage (HV) and low voltage (LV) thermal systems and their respective components/actuators via one or more respective LIN buses. For every valid wakeup reason or event, the VMMS provides additional information to the thermal systems/components on when to execute their functions. When the ePT supervisory controller ("ePT SC") commands a battery management system (BMS) or battery pack control module (BPCM) to close the HV contactor(s) to enable HV to the electrified powertrain or propulsion system, a direct current to direct current (DC-DC) converter is allowed to charge and maintain low voltage (12V) loads and a low voltage system or battery.

When the VMMS detects a reason to go to sleep, it will request the HV thermal systems to stop HV energy consumption. Then, the VMMS provides another request recommending the LV thermal systems to complete their functions within a calibratable period. The LV thermal systems then need to provide feedback to the VMMS indicating that they have completed their activities. Upon confirmation, the VMMS requests the LIN buses to be disabled and shutdown after which the entire network and the propulsion system controllers (e.g., the ePT SC) can go to sleep.

Figure 1:
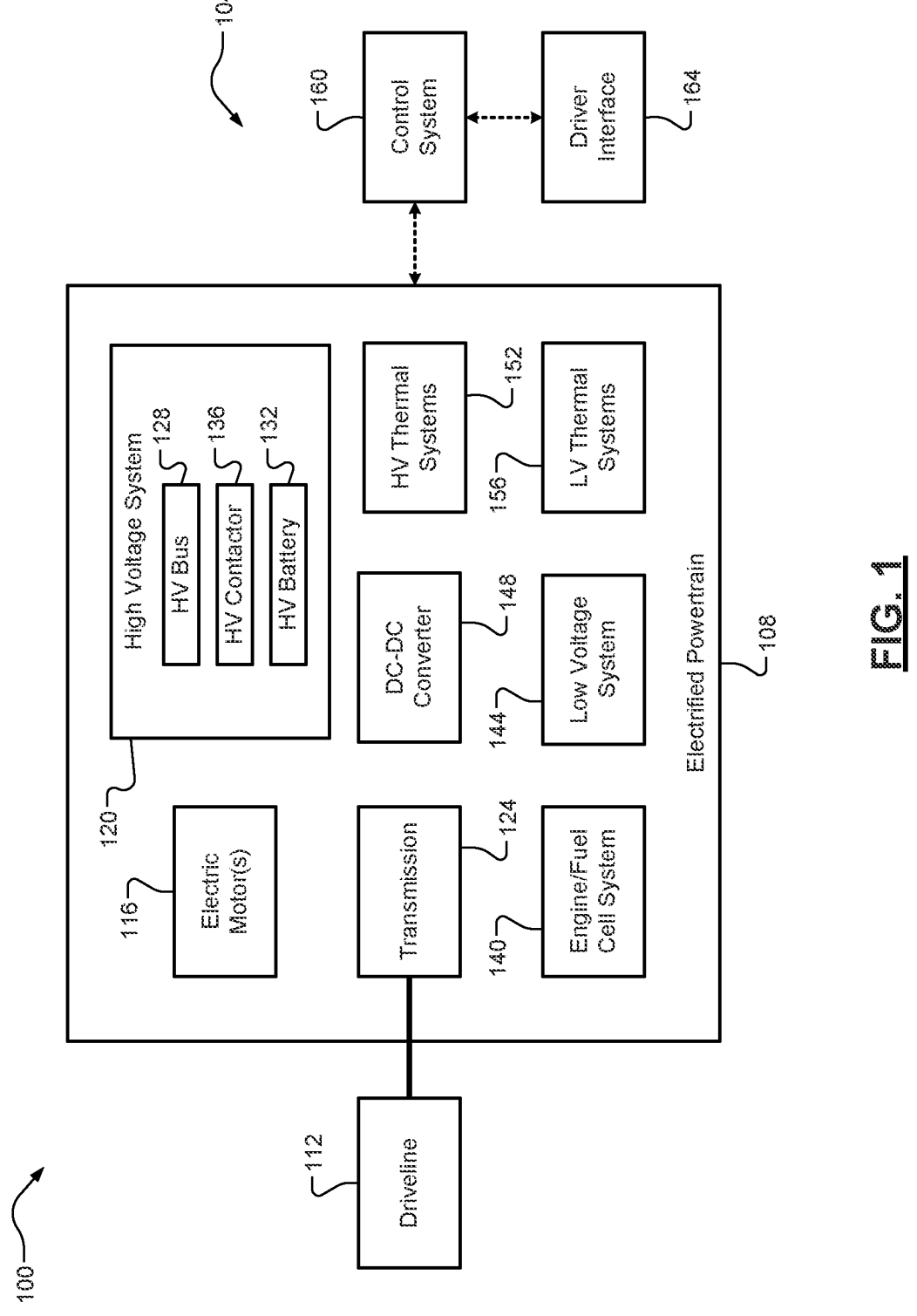
FIG. 1 is a functional block diagram of an electrified vehicle having an example control and thermal management system according to the principles of the present application.

Referring now to FIG. 1, a functional block diagram of an electrified vehicle 100 having an example control and thermal management system 104 according to the principles of the present application is illustrated. The electrified vehicle 100 generally comprises an electrified powertrain 108 configured to generate and transfer torque to a driveline 112 for vehicle propulsion. Specifically, the electrified powertrain 108 includes one or more electric motors 116 (e.g., electric traction motors) that are selectively provided with high voltage from a HV system 120. The torque generated by the electric motor(s) 116 is transferred to the driveline 112 via a transmission 124, such as a multi-speed automatic transmission.

The HV system 120 includes a HV bus 128 that is connected to the electric motor(s) 116 (e.g., a three-phase inverter, not shown, therebetween) and to a HV battery pack or system 132, with one or more contactors 136 arranged therebetween. In some implementations, the electrified powertrain 108 includes another energy source, such as an internal combustion engine and/or a fuel cell system 140. The electrified powertrain 108 also includes a LV system 144 (e.g., a 12V battery) and a DC-DC converter 148 for stepping up/down supplied voltage, such as for supporting/recharging the LV system 144 using the HV system 120.

The electrified powertrain 108 also includes a set of HV thermal systems 152 and a set of LV thermal systems 156. While shown as part of the electrified powertrain 108, it will be appreciated that these thermal systems 152, 156 could be separate from the electrified powertrain 108. Each set of thermal systems 152, 156 includes low or high voltage powered thermal actuators or components (heaters, chillers, etc.), such as airflow control devices (fans, active vents/shutters, etc.) and fluid control devices (radiators, pumps/compressors/evaporators, etc.) that are configured to perform heat exchanging functions on a target medium. The electrified vehicle 100 and, more particularly, the electrified powertrain 108 is controlled by a control system 160.

The control system 160 controls operation of the electrified vehicle 100 and, in particular, controls the electrified powertrain 108 to generate and transfer a desired amount of torque to the driveline 112 to satisfy a driver torque request, which could be provided by a driver of the electrified vehicle 100 via a driver interface 164 (e.g., an accelerator pedal). The control system 160 is also configured to perform at least a portion of the control and thermal management techniques of the present application, which will now be described in greater detail.

Figure 2:
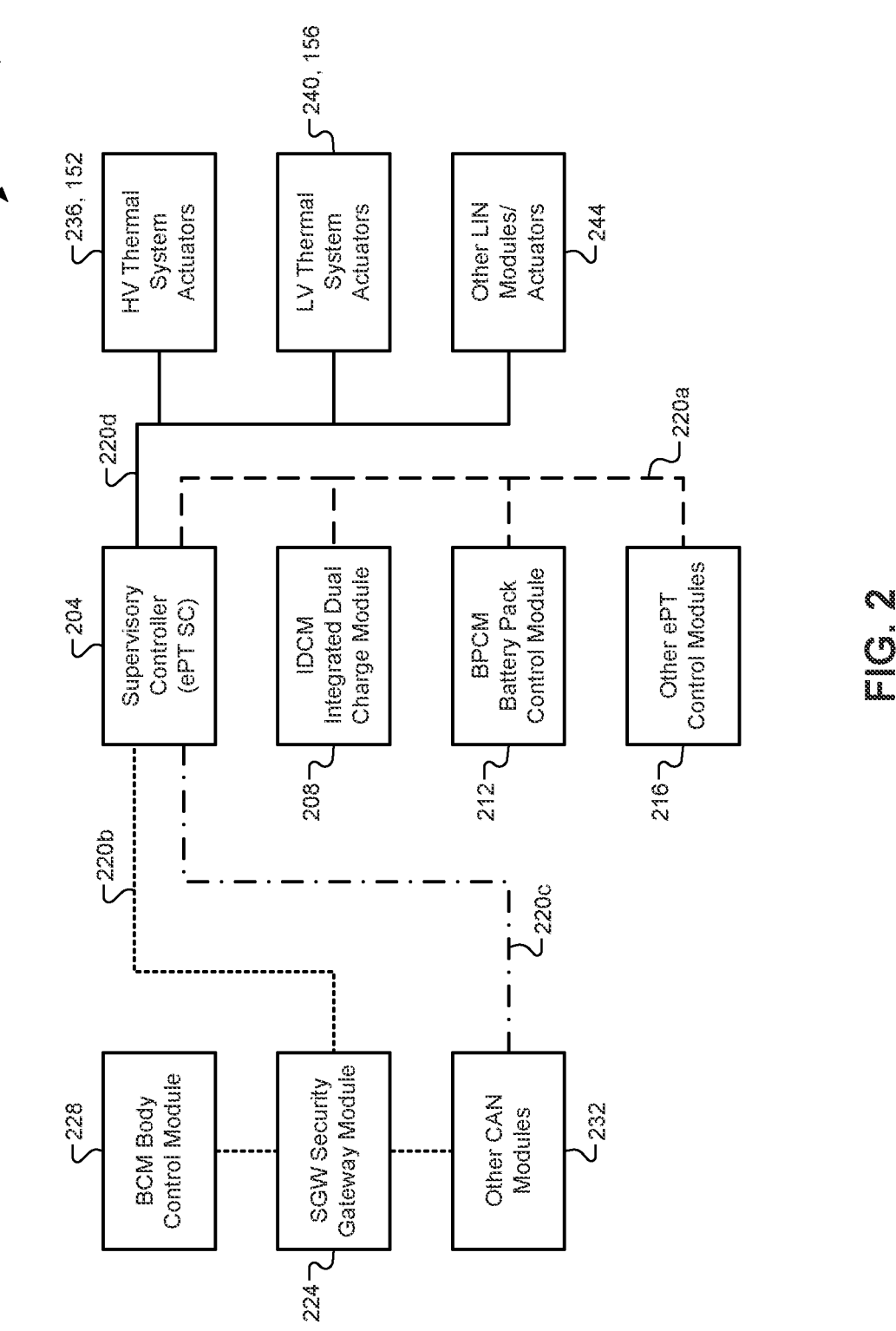
FIG. 2 is a functional block diagram of an example architecture for the electrified vehicle control and thermal management system according to the principles of the present application.

Referring now to FIG. 2, a functional block diagram of an example architecture 200 for the electrified vehicle control and thermal management system 104 (hereinafter, "system 200") according to the principles of the present application is illustrated. The system 200 includes an electrified powertrain supervisory controller (ePT SC) 204 that is configured to control operation of the electrified powertrain 108 and also to operate selectively as a vehicle mode management sub-system (VMMS) as part of the techniques of the present application. The ePT SC 204 is in communication with other ePT controllers or modules, including an integrated dual charging module (IDCM) 208, a battery pack control module (BPCM) 212, and other ePT control modules 216 (an engine control module (ECM), a fuel cell propulsion system (FCPS) module, etc.) via a first CAN bus 220a (also referred to as an "ePT bus"). The ePT SC is also configured to communicate with a security gateway (SGW) module 224 via a second CAN bus 220b.

The SGW module 224 acts as a supervisor module for various activities, including, but not limited to, firmware over-the-air (FOTA) flash update control and, in some cases, as the part of the VMMS for purposes of the present application. The SGW module 224 could also be configured to communicate with other CAN modules, such as a body control module (BCM) 228 and other CAN modules (telematics/entertainment module(s), a radio frequency hub module (RFHM), etc.) 232 via the CAN bus 220b and/or some of these other CAN modules 232 could be in direct communication with the ePT SC 204 via a third CAN bus 220c.

The ePT SC 204 is also configured to communicate with a set of HV thermal system actuators 236 (e.g., of the HV thermal systems 152) and a set of LV thermal system actuators 240 (e.g., of the LV thermal systems 156) via one or more respective LIN buses 220d. It will be appreciated that the ePT SC 204 could also be configured to communicate with other LIN modules/actuators 244 (lock actuators, sensors, etc.) via the one or more LIN buses 220d. In response to a valid wakeup request for the electrified vehicle 100 (e.g., a valid ignition-on request from a previous ignition-off state), the ePT SC 204 is configured to transmit, via the LIN bus 220d, timing instructions for operation of the set of LV thermal system actuators 240, thereby avoiding unnecessary energy drainage from the low voltage system 148.

In addition, in response to an ignition-off request (e.g., from a previous ignition-on state), the ePT SC 204 is configured to command, via the LIN bus 220d, a request for the set of LV thermal system actuators 240 to complete their existing functions within a calibratable period. Then, in response to a function completion confirmation from the set of LV thermal system actuators 240, the ePT SC is configured to command the LIN bus 220d and the set of LV thermal system actuators 240 to shutdown, thereby avoiding a communication delay or a malfunction that could result in the set of LV thermal system actuators 240 remaining active after the LIN bus 220d is shutdown.

Figure 3:
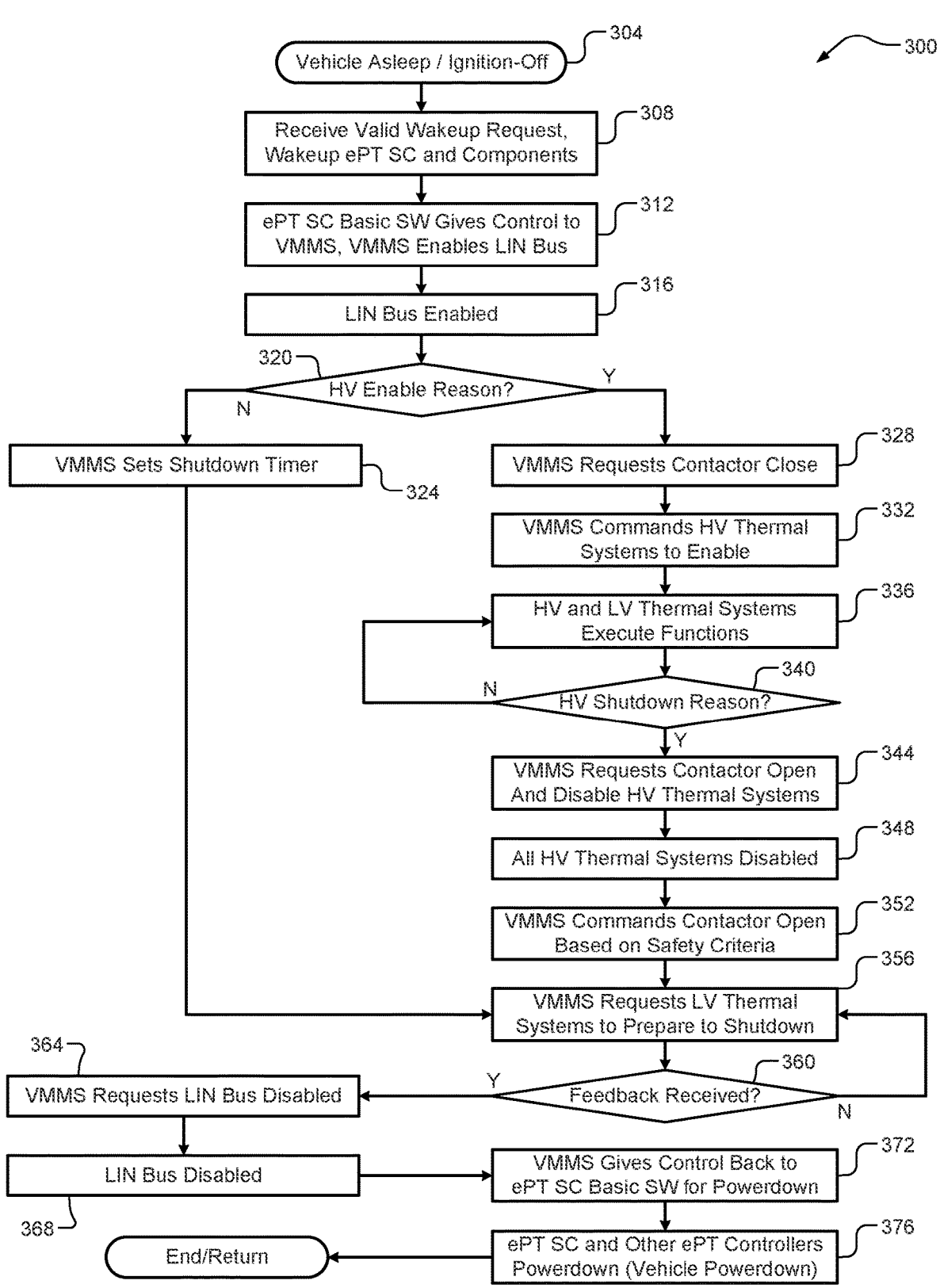
FIG. 3 is a flow diagram of an example control and thermal management method for an electrified vehicle according to the principles of the present application.

Referring now to FIG. 3, a flow diagram of an example control and thermal management method 300 for an electrified vehicle according to the principles of the present application is illustrated. While the electrified vehicle 100 and its components are specifically referenced for descriptive/illustrative purposes, it will be appreciated that the method 300 could be applicable to any suitably configured electrified vehicle. The method 300 begins at 304 where the electrified vehicle 100 is asleep (an ignition-off status). At 308, a valid wakeup request for the electrified vehicle 100 is received and the ePT SC 204 wakes up itself and other ePT components (e.g., on the ePT bus 220a). At 312, the ePT SC 204 basic software (SW) gives temporary control to the VMMS and the VMMS enables the LIN bus 220d. At 316, the LIN bus 220d is enabled. At 320, it is determined whether a reason exists to enable the HV system 120. When false, the method 300 proceeds to 324 where the VMMS sets a shutdown timer and the method 300 proceeds to 356. At 328, the VMMS requests the HV contactor(s) 132 to close. At 332, the VMMS commands the HV thermal systems 152 (e.g., HV thermal system actuators 236) to enable. At 336, the HV and LV thermal systems 152, 156 (e.g., HV and LV thermal system actuators 236, 240) execute their functions.

At 340, it is determined whether there is a reason to shutdown the HV system 120. When false, the method 300 returns to 336. When true, the method 300 proceeds to 344. At 344, the VMMS requests the HV contactor(s) 132 to open and disables the HV thermal systems 152 (e.g., the HV thermal system actuators 236). At 348, all of the HV thermal systems 152 are disabled. At 352, the VMMS commands the HV contactor(s) 132 to open when a set of safety criteria are satisfied (e.g., ensuring that HV consumption is fully disabled). At 356, the VMMS requests the LV thermal systems 156 (e.g., the LV thermal system actuators 240) to prepare to shutdown. At 360, the VMMS determines whether feedback (confirmation) from the LV thermal systems 156 has been received. When false, the method 300 returns to 356. When true, the method 300 proceeds to 364. At 364, the VMMS requests the LIN bus 220d to disable. At 372, the VMMS gives control back to the ePT SC 204 (i.e., return to the basic SW execution) for powerdown. At 376, the ePT SC 204 and other ePT modules/controllers (the IDCM 208, the BPCM 212, etc.) powerdown as part of a full powerdown of the electrified vehicle 100 as it goes to sleep. The method 300 then ends or returns to 304 for another cycle.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control and thermal management system for an electrified vehicle, the system comprising:
   a set of thermal systems each powered by a low voltage battery of the electrified vehicle and each configured to regulate a temperature of a thermal loop of the electrified vehicle; and
   a supervisory controller connected to the set of thermal systems via a local interconnect network (LIN) bus and configured to:
      in response to a valid wakeup request, transmit, via the LIN bus, timing instructions for operation of the set of thermal systems, thereby avoiding unnecessary energy drainage from the low voltage battery;
      in response to an ignition-off request, command, via the LIN bus, a request for the set of thermal systems to complete their existing functions within a calibratable period; and
      in response to a function completion confirmation from the set of thermal systems, command the LIN bus and the set of thermal systems to shutdown, thereby avoiding a communication delay or a malfunction that could result in the set of thermal systems remaining active after the LIN bus is shutdown.

2. The system of claim 1, wherein the electrified vehicle goes to sleep in response to the ignition-off request after the set of thermal systems and the LIN bus are shutdown.

3. The system of claim 1, wherein the set of thermal components includes at least one of a fan and a pump.

4. The system of claim 1, wherein the electrified vehicle also includes another set of thermal systems powered by a high voltage system of the electrified vehicle.

5. The system of claim 4, wherein the supervisory controller is further configured to command a high voltage contactor of the high voltage system to close to enable the high voltage system and allow a direct current to direct current (DC-DC) converter to charge and maintain the low voltage battery.

6. The system of claim 5, wherein the high voltage system and the DC-DC converter are further configured to power at least some of the set of thermal devices associated with the low voltage battery.

7. The system of claim 5, wherein avoiding unnecessary energy drainage from the low voltage battery ensures the electrified vehicle is capable at least one of (i) cranking an engine of the electrified vehicle and (ii) closing a high voltage contactor of a high voltage battery system of the electrified vehicle without a current spike causing the high voltage contactor to weld.

8. The system of claim 1, wherein the communication delay is a result of the LIN bus being slower than other controller area network (CAN) buses and the malfunction is a memory corruption or error.

9. The system of claim 8, wherein avoiding the communication delay and the malfunction ensures that the set of thermal components avoid potential damage due to unnecessary and unexpected operation.

10. A control and thermal management method for an electrified vehicle, the method comprising:

provided a set of thermal systems and a supervisory controller connected to each other via a local interconnect (LIN) bus, wherein each thermal system is powered by a low voltage battery of the electrified vehicle and is configured to regulate a temperature of a thermal loop of the electrified vehicle;

in response to a valid wakeup request, transmitting, by the supervisory controller and via the LIN bus, timing instructions for operation of the set of thermal systems, thereby avoiding unnecessary energy drainage from the low voltage battery;

in response to an ignition-off request, commanding, by the supervisory controller and via the LIN bus, a request for the set of thermal systems to complete their existing functions within a calibratable period; and in response to a function completion confirmation from the set of thermal systems, commanding, by the supervisory controller, the LIN bus and the set of thermal systems to shutdown, thereby avoiding a communication delay or a malfunction that could result in the set of thermal systems remaining active after the LIN bus is shutdown.

11. The method of claim 10, wherein the electrified vehicle goes to sleep in response to the ignition-off request after the set of thermal systems and the LIN bus are shutdown.

12. The method of claim 10, wherein the set of thermal components includes at least one of a fan and a pump.

13. The method of claim 10, wherein the electrified vehicle also includes another set of thermal systems powered by a high voltage system of the electrified vehicle.

14. The method of claim 13, further comprising commanding, by the supervisory controller, a high voltage contactor of the high voltage system to close to enable the high voltage system and allow a direct current to direct current (DC-DC) converter to charge and maintain the low voltage battery.

15. The method of claim 14, wherein the high voltage system and the DC-DC converter are further configured to power at least some of the set of thermal devices associated with the low voltage battery.

16. The method of claim 14, wherein avoiding unnecessary energy drainage from the low voltage battery ensures the electrified vehicle is capable at least one of (i) cranking an engine of the electrified vehicle and (ii) closing a high voltage contactor of a high voltage battery system of the electrified vehicle without a current spike causing the high voltage contactor to weld.

17. The method of claim 10, wherein the communication delay is a result of the LIN bus being slower than other controller area network (CAN) buses and the malfunction is a memory corruption or error.

18. The method of claim 17, wherein avoiding the communication delay and the malfunction ensures that the set of thermal components avoid potential damage due to unnecessary and unexpected operation.

* * * * *